Patented May 2, 1933

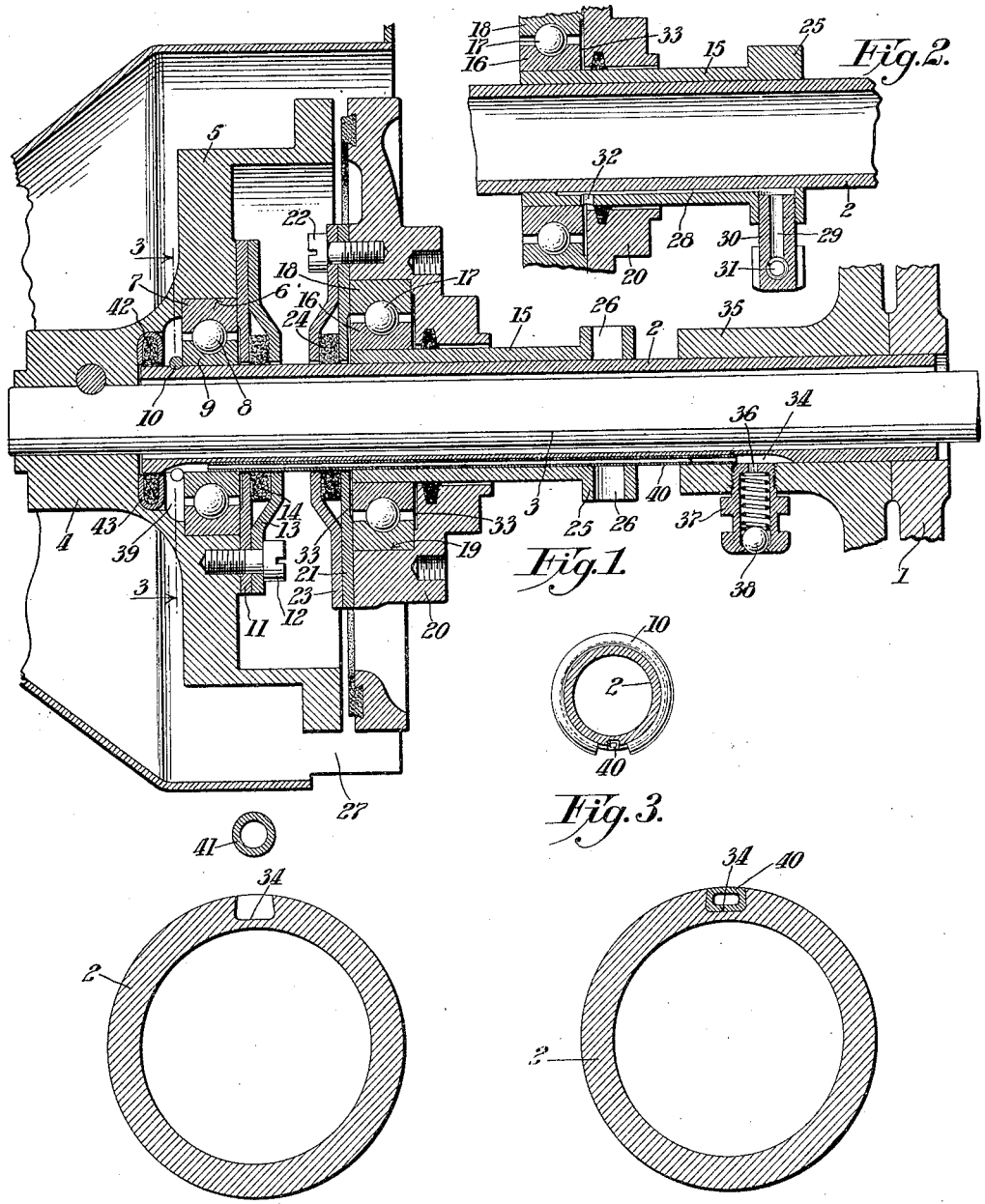

1,907,023

UNITED STATES PATENT OFFICE

IRVING F. WEBB, OF ELIZABETH, NEW JERSEY, ASSIGNOR TO THE SINGER MANUFACTURING COMPANY, OF ELIZABETH, NEW JERSEY, A CORPORATION OF NEW JERSEY

BEARING LUBRICATING DEVICE

Application filed January 28, 1931. Serial No. 511,749.

This invention relates to improvements in lubricating devices for the bearing journals of rotary elements and aims to provide simple and efficient means for supplying lubricant to a bearing journal from a point remote from said journal.

The invention consists in the devices, combinations and arrangements of parts hereinafter described and claimed.

The features of the invention and the advantages attained thereby will be obvious to those skilled in the art from the following detailed description of a preferred embodiment of the invention, in which Fig. 1 is a substantially central horizontal section of a power-transmitter having the present improved bearing-lubricating device. Fig. 2 is an inverted, substantially vertical sectional view of the driven-clutch shifting sleeve and its supporting sleeve. Fig. 3 is a sectional view substantially on the line 3—3 of Fig. 1. Fig. 4 is an enlarged transverse section of the supporting sleeve, illustrating the groove adapted to receive the soft-metal conduit shown separately in section, and Fig. 5 is a similar view of the supporting sleeve with the conduit wedged into the groove.

A more complete disclosure of the power-transmitter in which the present improvement has been embodied is made in the U. S. patent to G. M. Eames et al., No. 1,688,414, issued October 23, 1928, to which reference may be had for a further understanding of details of construction of the power-transmitter.

The power-transmitter includes a hanger 1 which is apertured to receive a stationery supporting sleeve 2 projecting substantially horizontally from one side of the hanger. Disposed within the supporting sleeve 2 but free of contact therewith is a driving shaft 3 upon an end of which, extending beyond the free end of the sleeve 2, is suitably secured the hub 4 of an actuating element comprising a driving clutch-member 5. The clutch-member 5 overhangs the end of the supporting sleeve and is provided with an annular recess 6 in which is fixedly seated the outer race-ring 7 for balls 8 of a ball-bearing journal for the rotary clutch-member 5. The inner race-ring 9 of said ball-bearing is fixed upon the supporting sleeve adjacent the free end thereof and is held against movement toward the free end of the sleeve by a split ring 10 embedded in a circumferential groove in the sleeve 2. The outer race-ring 7 is held in its recessed seat 6 by a clamp-plate 11 fastened by screws, as 12, upon the clutch-member 5, said screws also serving to secure a retaining plate 13 for a packing-ring 14. It will be understood from the foregoing that the driving shaft 3 is supported by the actuated element 5 driven thereby and that said element 5, which in the present instance is in the form of a driving clutch-member, has a ball-bearing journal upon the stationary sleeve 2.

Slidingly disposed upon the supporting sleeve 2 is a shift-sleeve 15 upon which is suitably fixed the inner race-ring 16 for the balls 17 of another ballbearing, of which the outer race-ring 18 is secured in an annular recess 19 provided in a driven clutch-member 20, said outer race-ring 18 being secured in its clutch-member seat by a clamp-plate 21 fastened by screws, as 22. The screws 22 also serve to secure a retaining-plate 23 for a packing-ring 24. The shift-sleeve has at one end a flange 25 provided at diametrically opposite sides with apertures 26 for the trunnions of the usual fork (not shown) serving to shift the sleeve 15 lengthwise of the supporting sleeve 2 to thereby effect driving engagement and disengagement of the clutch-members 5 and 20. These clutch-members are surrounded by the usual cylindrical guard 27.

In order to provide means for lubricating the ball-bearing journal of the driven clutch-member 19, the shift-sleeve 15 is provided longitudinally thereof and in its inner face with a channel 28 terminating at its opposite ends within the ends of the shift-sleeve. Communicating with one end of the channel 28 is an aperture 29 in a lubricant-receiving nipple 30, threaded into the shift-sleeve flange 25 and having the usual spring-pressed ball check 31. The other end of the channel 28 is connected by an aperture 32 in the shift-sleeve with an annular recess 33 formed in the driven clutch-member 20 adjacent to the inner race-ring 16 thereof, whereby lubricant introduced into the nipple 30 may be supplied to the ball-bearing of the driven clutch-member.

However, the primary problem solved by the present invention is the lubrication of the ball-bearing journal of the driving clutch-member 5, rendered inaccessible by the guard 27 and the driven clutch-member 20. In accordance with the present improvement, the stationary supporting-sleeve 2 is provided in its outer face at the front side of the transmitter with a groove 34 extending longitudinally of and terminating within the ends of said sleeve. This groove 34 is preferably formed to have a constricted opening at the surface of the sleeve, one end of the groove terminating within an apertured and stationary bracket-member 35 disposed upon the sleeve 2 adjacent to the hanger 1. Communicating with said end of the groove is an aperture 36 in a lubricant-receiving nipple 37, threaded into the bracket-member 35 and having the usual spring-pressed ball check 38. The other end of the groove 34 terminates within an annular recess 39 formed in the driving clutch-member 5 adjacent to the inner race-ring 9 thereof, said groove passing between the spaced ends of the split ring 10 upon the sleeve 2.

Disposed longitudinally in the groove 34 is a groove closure comprising a lubricant conduit 40, one end of said conduit terminating adjacent to the nipple-aperture 36 and the other end terminating adjacent to the split ring 10. In the preferred form of construction, the conduit 40, before insertion into the groove 33, comprises a soft-metal tube 41, as shown in Fig. 4. This tube is force fitted into the groove of which the constricted opening is in the present case formed by slightly converging the side walls thereof in a direction away from the base of the groove whereby the tube is securely retained within the groove. The tube is preferably of slightly greater diameter than the depth of the groove 34, so that said tube is deformed or flattened into close affinity with the walls of the groove by the action of fitting it into the groove until it is flush with the cylindrical outer surface of the sleeve 2 to substantially fill the groove.

It will be understood from the foregoing description that lubricant introduced into the nipple 37 passes into the adjacent end of the groove 34 and then into the conduit 40 from which it emerges into the opposite end of the groove 34 which directs the lubricant into the recess 39 and therefore to the ball-bearing journal of the driving clutch-member 5. Preferably, egress of lubricant from the end of the sleeve 2 is blocked by a packing 42 engaging said sleeve and held by an annular ring 43 force-fitted into the driving clutch-member.

While the present lubricant-conduit expedient has been illustrated in connection with a commercially well known power-transmitter, it will be obvious that it is adapted for use in lubricating any bearing-journals not conveniently accessible for direct lubrication or in which it is desired for other reasons to supply the lubricant from a point remote to the bearing-journal. Furthermore, it is to be understood that the invention, in its broader aspects, is not limited to a conduit formed from a soft-metal tube, as it is obvious that, for instance, a channeled instead of a tubular article might be employed for the purpose.

Having thus set forth the nature of the invention, what I claim herein is:—

1. Lubricating means for the bearing journal of an actuated element comprising, a cylindrical supporting member for said actuated element provided with an undercut groove extending lengthwise and terminating within the ends of said member, and a soft-metal conduit fitted into said groove to extend lengthwise thereof substantially flush with the cylindrical surface of said member throughout the length of the conduit, said conduit having an inlet aperture at a point remote from the bearing journal of said element and an outlet aperture adjacent said bearing journal, whereby lubricant may be supplied through said conduit to the bearing journal of said element.

2. Lubricating means for a bearing journal comprising, an elongated member provided lengthwise thereof with an undercut groove, a lubricant-conducting groove closure pressed laterally into said groove and thereby deformed into close affinity with the walls of the groove, means for directing lubricant into the groove closure, and means for directing lubricant from said groove closure to the bearing journal.

3. Lubricating means for a bearing journal comprising, an elongated tubular member provided lengthwise in one face thereof with an undercut groove, a lubricant-conducting groove closure pressed laterally into said groove and thereby deformed into close affinity with the walls of the groove and substantially flush with said face of the member throughout the length of the groove closure, means for directing lubricant into the groove closure, and means for directing lubricant from said groove closure to the bearing journal.

4. Lubricating means for a bearing journal comprising, an elongated tubular member provided lengthwise in one face thereof with an undercut groove terminating at its opposite ends within the ends of said member, a lubricant-conducting groove closure pressed laterally into said groove and thereby deformed into close affinity with the walls of the groove, said groove closure having an inlet aperture at a point remote from the bearing journal and an outlet aperture adjacent the bearing journal.

5. Lubricating means for a bearing journal of a rotary element comprising, a tubular supporting member for said rotary element provided lengthwise in one face thereof with an undercut groove terminating at its opposite ends within the ends of said member, a lubricant conduit pressed laterally into said groove and thereby deformed into close affinity with the walls of the groove, said conduit terminating within the ends of said groove and having an inlet aperture at a point remote from the bearing journal and an outlet aperture adjacent to the bearing journal.

In testimony whereof I have signed my name to this specification.

IRVING F. WEBB.